U. WEDGE.
DUST COLLECTOR.
APPLICATION FILED SEPT. 14, 1916.

1,267,023.

Patented May 21, 1918.
7 SHEETS—SHEET 1.

INVENTOR UTLEY WEDGE
BY HIS ATTORNEY Harry Smith

U. WEDGE.
DUST COLLECTOR.
APPLICATION FILED SEPT. 14, 1916.

1,267,023.

Patented May 21, 1918.
7 SHEETS—SHEET 2.

INVENTOR
UTLEY WEDGE
BY HIS ATTORNEY
Harry Smith

U. WEDGE.
DUST COLLECTOR.
APPLICATION FILED SEPT. 14, 1916.

1,267,023.

Patented May 21, 1918.
7 SHEETS—SHEET 3.

INVENTOR
UTLEY WEDGE
BY HIS ATTORNEY
Harry Smith

INVENTOR
UTLEY WEDGE
BY HIS ATTORNEY

U. WEDGE.
DUST COLLECTOR.
APPLICATION FILED SEPT. 14, 1916.

1,267,023.

Patented May 21, 1918.
7 SHEETS—SHEET 5.

INVENTOR
UTLEY WEDGE
BY HIS ATTORNEY
Harry Dewitt

U. WEDGE.
DUST COLLECTOR.
APPLICATION FILED SEPT. 14, 1916.

1,267,023.

Patented May 21, 1918.
7 SHEETS—SHEET 7.

INVENTOR
UTLEY WEDGE
BY HIS ATTORNEY Harry Smith

UNITED STATES PATENT OFFICE.

UTLEY WEDGE, OF ARDMORE, PENNSYLVANIA, ASSIGNOR TO THE PROCESS ENGINEERING COMPANY, OF PHILADELPHIA, PENNSYLVANIA, A CORPORATION OF PENNSYLVANIA.

DUST-COLLECTOR.

1,267,023.

Specification of Letters Patent. Patented May 21, 1918.

Application filed September 14, 1916. Serial No. 120,179.

*To all whom it may concern:*

Be it known that I, UTLEY WEDGE, a citizen of the United States, residing in Ardmore, Pennsylvania, have invented certain Improvements in Dust-Collectors, of which the following is a specification.

My invention relates to that type of dust collectors which are interposed in the path of the dust laden gases and serve to effect separation of the particles of dust from the gases by gravity, the object of my invention being to provide a separator of this type which can be cheaply and rapidly constructed of any desired dimensions, will effectually resist the heat to which it is subjected, and will present such large areas for the passage of gas and discharge of dust that the flow of gas can be frequently checked and diverted without throttling such flow and the free discharge of the dust particles will not be obstructed by accumulation of dust deposits in the flow or discharge passages.

By preference, the separator is so constructed that dust particles once separated from the gases are thereafter directed to the discharge point through a passage free from the disturbing influence of the gas flow.

In the accompanying drawings—

Fig. 4ª is a perspective view on a larger scale showing a preferred form of said block;

Fig. 11ª is a perspective view on a larger scale of one of said blocks;

Fig. 12ª is a perspective view on a larger scale of the preferred form of block of this type;

Fig. 18ª is an enlarged perspective view of a preferred form of one type of block employed in said structure;

Fig. 19ª is an enlarged perspective view of said type of block;

Fig. 19ᵇ is a similar perspective view of another form of said block;

Fig. 20ª is an enlarged perspective view of a block such as illustrated in Fig. 20;

Fig. 21ª is an enlarged perspective view of a block such as illustrated in Fig. 21;

Figure 1:
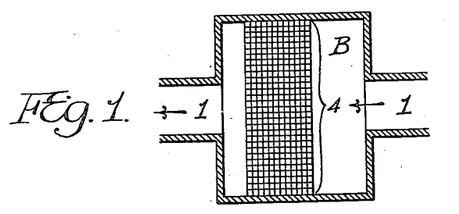
Figure 1 is a diagrammatic representation of a dust collector in accordance with my invention.

Referring in the first instance to Fig. 1 of the drawing, 1 represents a furnace flue or other source of supply for the dust-laden gases and through which the gases pass to the point of exit, this flue having formed therein an enlarged chamber B in which is located a dust collecting structure 4 made in accordance with my invention, such structure extending across the chamber B from side to side and from bottom to top of the chamber so that all of the escaping gases are compelled to pass through said structure.

The structure 4, shown in Figs. 2 to 10, is composed of blocks $x$ (Fig. 4) each having openings $x^2$ therethrough for the vertical passage of dust particles separated by gravity from the gases, said blocks being superposed so as to be disposed in successive horizontal courses, the blocks of each course being disposed in transverse and longitudinal rows, and each block constituting a part of both a transverse and a longitudinal row of its respective course.

Figure 2:
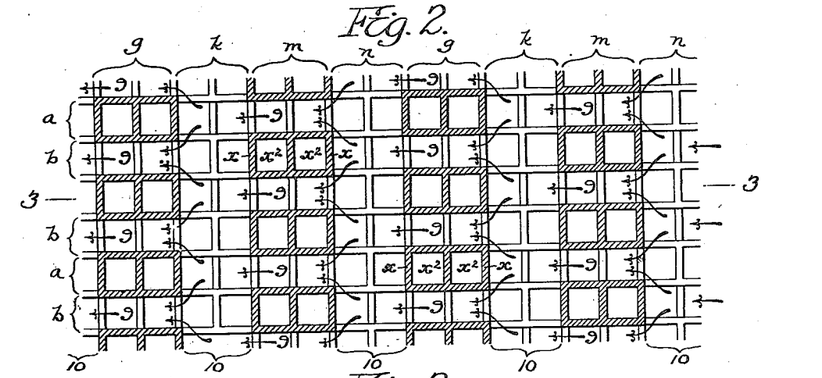
Fig. 2 is a horizontal section, on an enlarged scale, of a portion of said dust collector.
Figure 3:
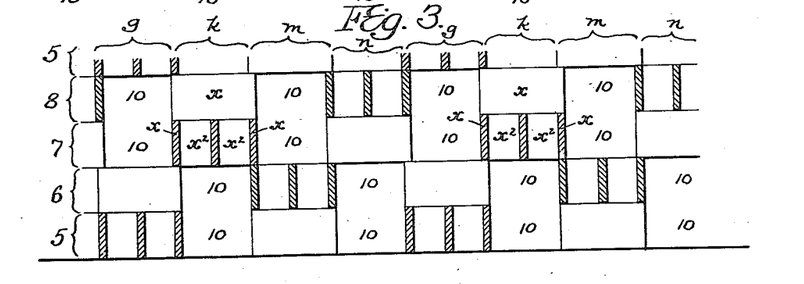
Fig. 3 is a vertical section of part of the structure on the line 3—3, Fig. 2.

The successive blocks of each transverse row have spaces 9 between them, the successive transverse rows are separated by transverse passages 10, and the blocks of each transverse row of each course are in line with the spaces 9 between the blocks of adjacent transverse rows of the same course so that gases flowing through the structure in the direction of the arrows in Fig. 2 will be deflected in the passages 10 as they pass from the spaces 9 between the blocks of each transverse row of a course to the spaces 9 between the blocks of the next successive transverse row of said course.

The gas flow will thus be frequently deflected from a straight course, but owing to the area of the passages 9 and 10, such deflection will not throttle the flow or cause diminution of its speed, the frequent deflections being for the purpose of facilitating the separation, by gravity, of solid particles from the gases, such separated particles dropping through the passages $x^2$ of the blocks $x$ and through the intervening passages 10 to the base of the chamber B which is intended to be provided with a suitable outlet for such particles.

Figure 4:
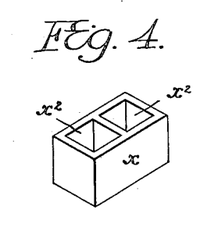
Fig. 4 is a perspective view of one of the blocks of which the dust collector shown in Figs. 2 and 3 is composed.
Figures 4A, 9:
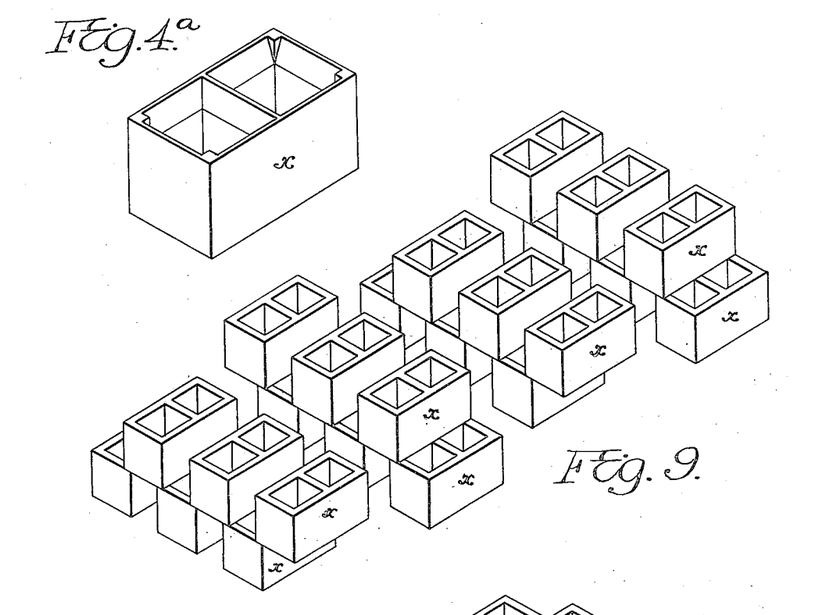
Fig. 9 is a perspective view showing blocks disposed as in Fig. 6, superposed upon blocks disposed as in Fig. 5.
Figure 5:
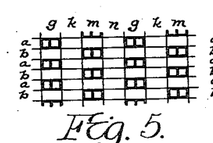
Figs. 5, 6, 7, and 8 are diagrams, on a reduced scale, showing the disposition of such blocks in successive horizontal courses of the structure.
Figure 6:
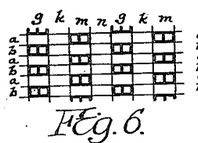
Figure 7:
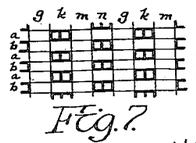
Figure 10:
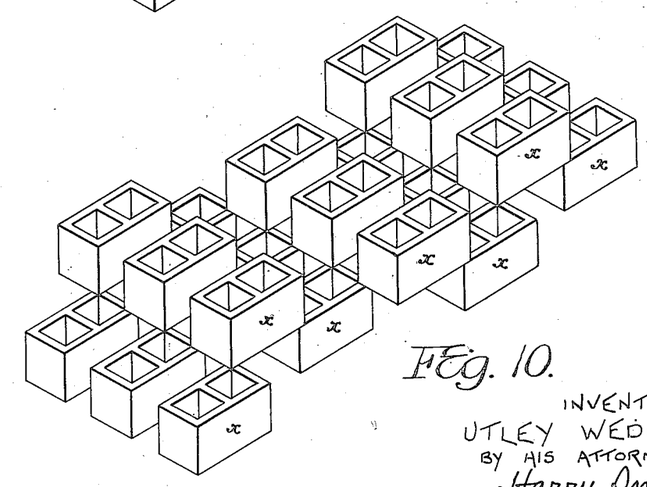
Fig. 10 is a similar view showing blocks disposed as in Fig. 7, superposed upon blocks disposed as in Fig. 6.

The blocks of each course are staggered both longitudinally and laterally in respect to the blocks of adjoining courses, as shown in Figs. 9 and 10, whereby parts of the walls of the blocks of one course may rest upon parts of the walls of the blocks of the course below it and thus permit of the building up of the structure by piling the blocks of each course upon those of the course below, thus, as shown in Fig. 9, right hand side walls of the blocks of a transverse row of one course rest upon left hand side walls of blocks of a transverse row of the course below it, and left hand side walls of blocks of the upper course rest upon right hand side walls of blocks of the under course, and, as shown in Fig. 10, walls at one end of blocks of a transverse row of an upper course rest upon opposite end walls of blocks of a transverse row of a lower course, and corners of the opposite end walls of the first named blocks rest upon corners of blocks of another transverse row of the lower course.

The structure may, if desired, be built up without the necessity of cementing the blocks together so that it can be readily erected or taken down.

As an instance of the disposition of the blocks so that they will mutually support one another I may refer to Figs. 5, 6, 7 and 8 which show the disposition of the blocks in successive courses of the structure.

Figure 8:
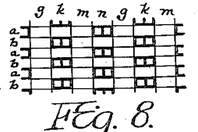

In course 5 (shown in Fig. 5) the blocks of the transverse row $g$ are disposed in the longitudinal rows $a$ and those of the transverse row $m$ are disposed in the longitudinal rows $b$, there being no blocks in the rows $k$ and $n$ which thus constitute the transverse passages between the rows $g$ and $m$; in course 6 (shown in Fig. 6) the blocks are likewise in the transverse rows $g$ and $m$ but the blocks of the transverse rows $g$ are in the longitudinal rows $b$ and those of the transverse row $m$ are in the longitudinal rows $a$, the rows $k$ and $n$ being free from blocks; in course 7 (shown in Fig. 7) the blocks are in the transverse rows $k$ and $n$, the rows $g$ and $m$ being free from blocks; and the same is true of course 8 (shown in Fig. 8). In course 7, however, the blocks of the transverse row $k$ are in the longitudinal rows $a$ and those of the transverse row $n$ are in the longitudinal rows $b$, whereas in course 8 the blocks of the transverse row $k$ are in longitudinal rows $b$ and those of the transverse row $n$ are in longitudinal rows $a$.

Proper support of the blocks of each course upon the blocks of the underlying course is therefore provided for, all of the courses having the longitudinal passages between the blocks, certain of the courses having the transverse connecting passages disposed between rows $k$ and $n$, and other courses having such transverse passages disposed between rows $g$ and $m$. While free longitudinal passage of the gases through the dust collector is thus provided there is such frequent change in the direction of the flow that by the time the gases escape from the discharge end of the structure they will have been practically freed from dust, while the passages through the blocks exposed to the passages 9 and 10 will serve to direct the separated dust particles to the point of discharge therefor.

While I prefer in constructing my improved dust separator to employ blocks each having two chambers separated by an interposed wall because of the strengthening of the block thus effected, each block may have but a single chamber, if desired, or, on the other hand, it may have more than two chambers.

In the operation of the structure heretofore described particles of solid matter separated from the gas flow at the top of the structure are again subjected to such flow wherever, in their fall, they cross another gas passage. In order to overcome this objection, while still preserving the general features of construction shown in Figs. 2 to 10, I have in Figs. 11 and 12 illustrated a structure composed of blocks $x'$ each of such blocks having, instead of a central transverse wall, an inclined partition $x^4$ extending from the top of the block at one end to the bottom of the block at a point about intermediate of the ends.

Figures 11, 11A:
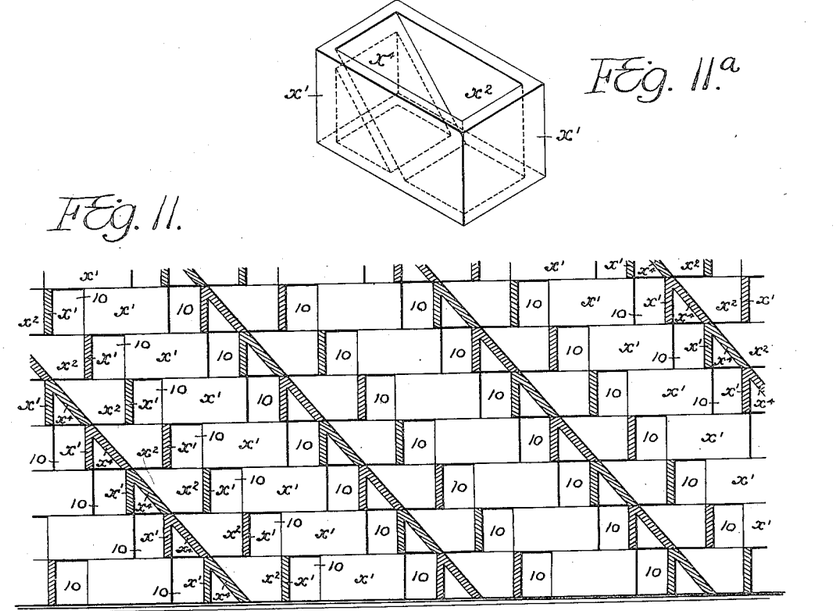
Fig. 11 is a view similar to Fig. 3, but illustrating a construction and arrangement of blocks which provides an inclosed dust passage.
Figures 12, 12A:
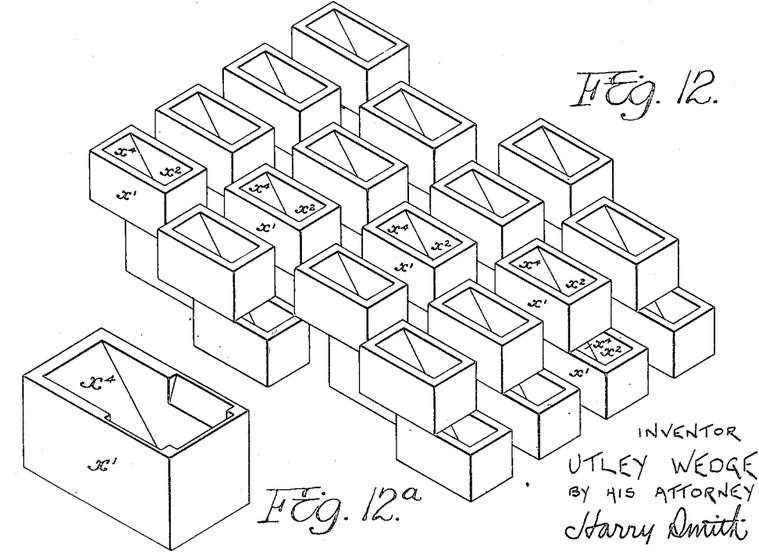
Fig. 12 is a perspective view showing blocks of successive superposed courses of the separator shown in Fig. 11.
Figure 13:
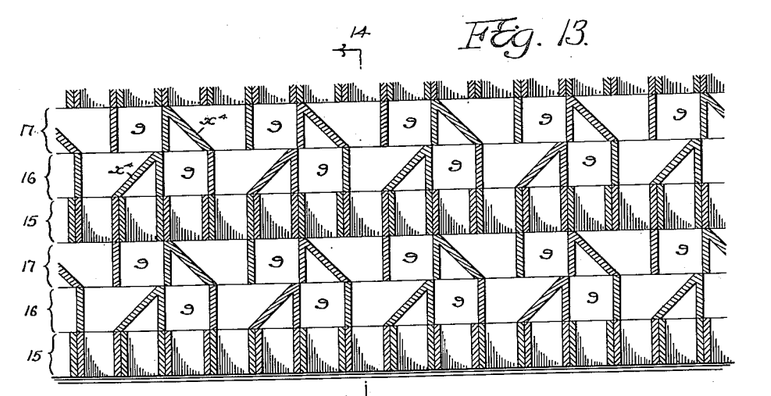
Fig. 13 is a transverse section of a structure in which blocks of the type shown in Fig. 12 are disposed in different arrangement from that shown in said figure.
Figure 14:
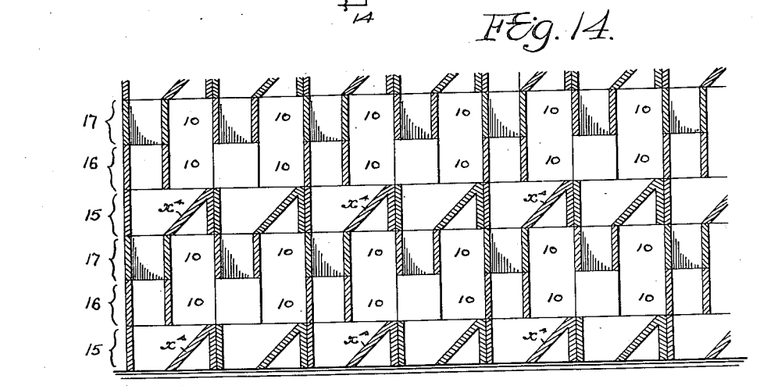
Fig. 14 is a longitudinal section on the line 14—14, Fig. 13.

In erecting the structure the blocks $x'$ are disposed in step-like form, as shown in Fig. 11, so that the lower ends of the partitions $x^4$ in the blocks of one course join the upper ends of the partitions $x^4$ in the blocks of the course below, and thus provide a continuous inclined guideway extending from top to bottom of the structure for the dust particles which are deposited upon said inclined partitions $x^4$, whereby such particles, once deposited upon one of these partitions, are thereafter protected from the forward flow of the gases through the structure.

Figure 15:
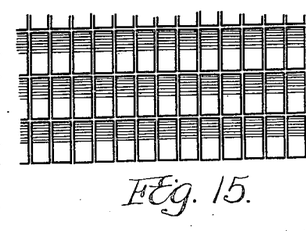
Figs. 15, 16 and 17 are diagrammatic views illustrating the disposal of the blocks in the three different courses contained in the structure shown in Figs. 13 and 14.
Figure 16:
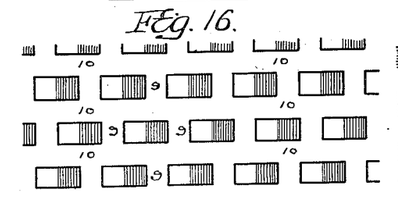
Figure 17:
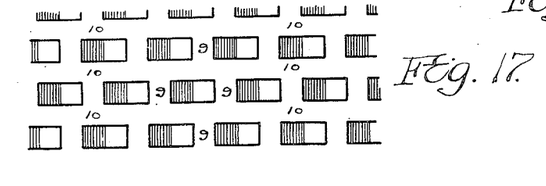

The structure shown in Figs. 13 to 17 comprises repetitions of three course sets of blocks, the blocks of each course of each set being similar to the blocks shown in Fig. 11, but the blocks in course 15 of each set being disposed closely together longitudinally and transversely, as shown in Fig. 15, and being at right angles to the blocks in courses 16 and 17 which are separated from each other both longitudinally and transversely so as to produce the longitudinal passages 9 and transverse passages 10, as shown in Figs. 16 and 17, the blocks of each transverse row being staggered in respect to the blocks of adjoining transverse rows, as also shown in Figs. 16 and 17, so as to prevent any direct longitudinal passage of the gases through the structure, and compel lateral deflection of said gases in each transverse passage 10.

The blocks in course 15 serve to receive dust from the passages 10 in courses 16 and 17 and to direct such dust into the transversely arranged blocks in courses 16 and 17 below them, whereby, as in Fig. 11, dust once dropped from the passage 10 never reënters such passage in a lower course.

In the structure shown in Figs. 18 and 22 courses of elongated blocks having one inclined end, as shown at $x^5$, alternate with courses of vertical-sided square blocks $x^6$ corresponding in dimensions with the bottoms of the blocks $x^5$ receiving the dust from the transverse passages 10 above the course in which such blocks are disposed, and directing said dust first to and through the block $x^6$ of the next course below, which discharges through the block $x^5$ of the course below that, and so on to the bottom of the structure.

Figure 18:
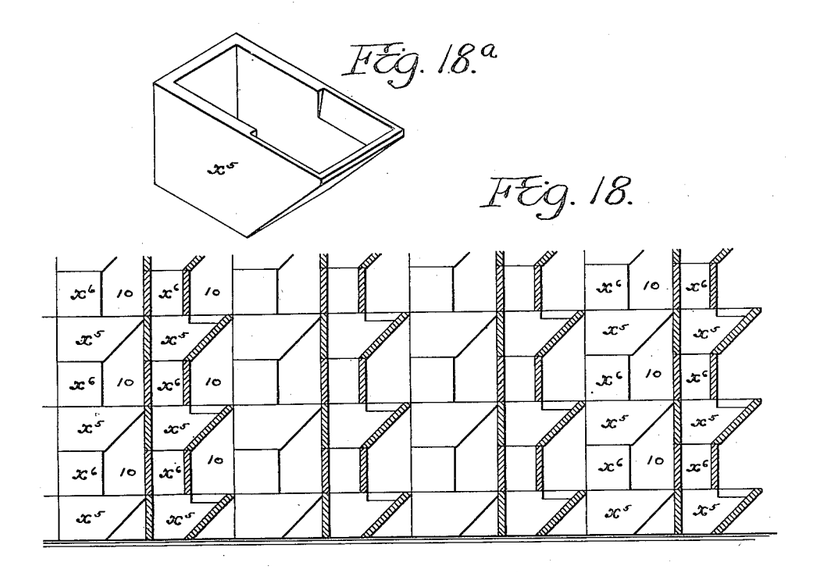
Fig. 18 is a longitudinal section of a structure in which two different forms of blocks are combined.
Figure 19:
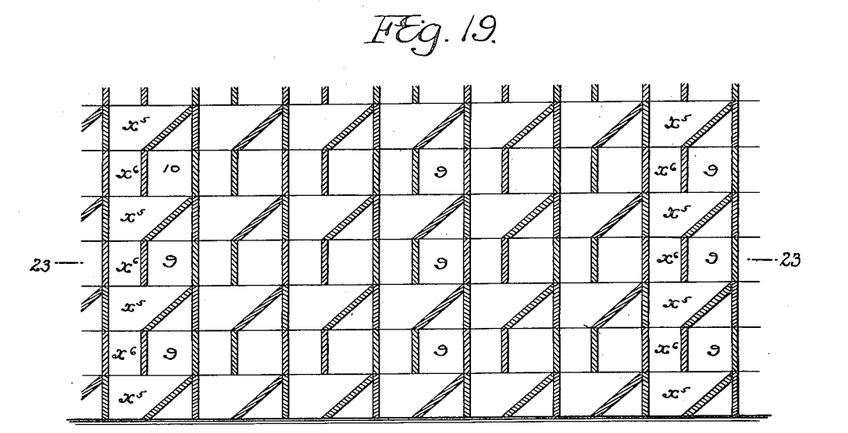
Fig. 19 is a transverse section illustrating a modified form of one of the types of blocks shown in Fig. 18.
Figure 19A:
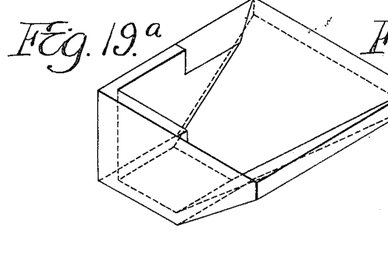
Figure 19B:
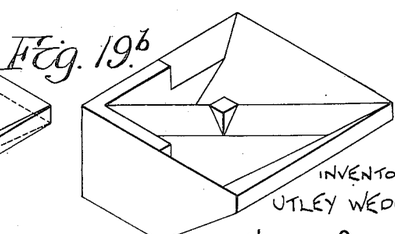
Figure 22:
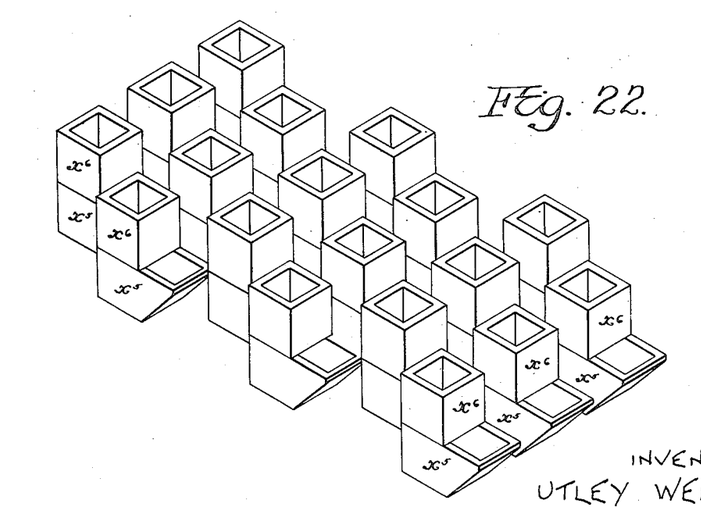
Fig. 22 is a perspective view showing parts of two courses of blocks of the character represented in Fig. 18.
Figure 23:
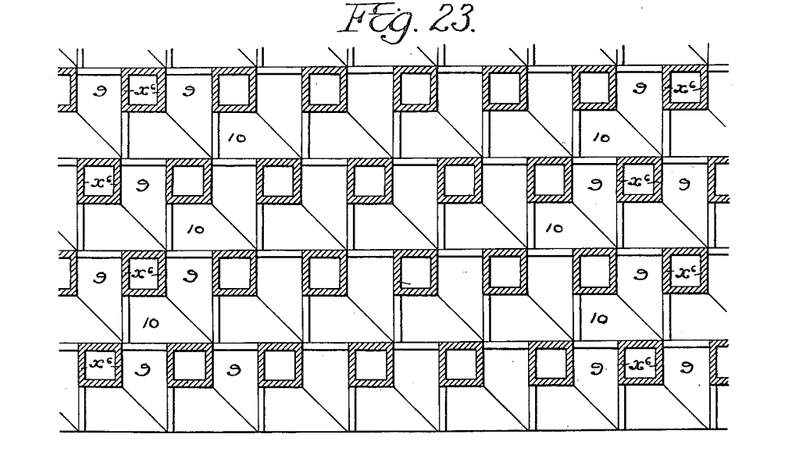
Fig. 23 is a horizontal section on the line 23—23, Fig. 19.

The structure shown in Figs. 19 and 23 is similar in general construction to that shown in Figs. 18 and 22, the difference being that the upper portions of the blocks $x^5$ are expanded both laterally and longitudinally in respect to the blocks $x^6$ so as to receive dust from the longitudinal passages 9 as well as from the transverse passages 10 of the structure.

Figure 20:
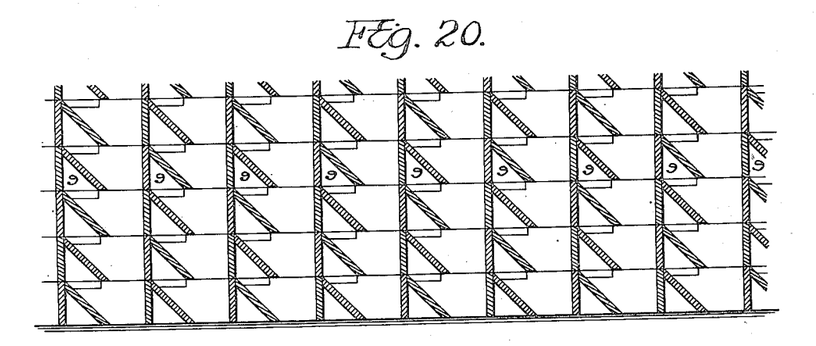
Figs. 20 and 21 are transverse sections illustrating structures in which the blocks of all the courses are disposed closely together.
Figures 20A, 21A:
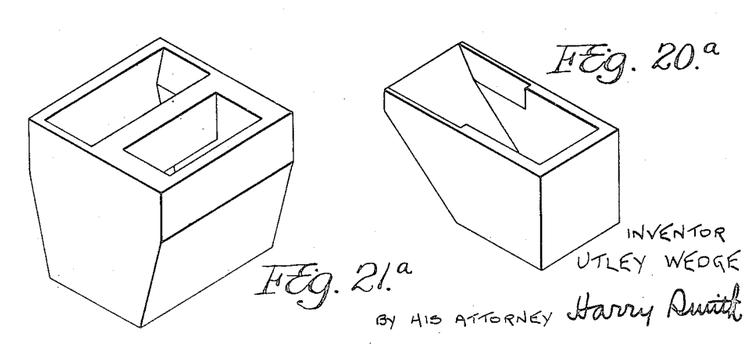

In the structure shown in Fig. 20 the blocks of the transverse rows are disposed closely end to end but one end of each block is inclined inwardly from top to bottom so as to form between adjoining blocks the longitudinal passages 9 for the flow of gas.

Figure 21:
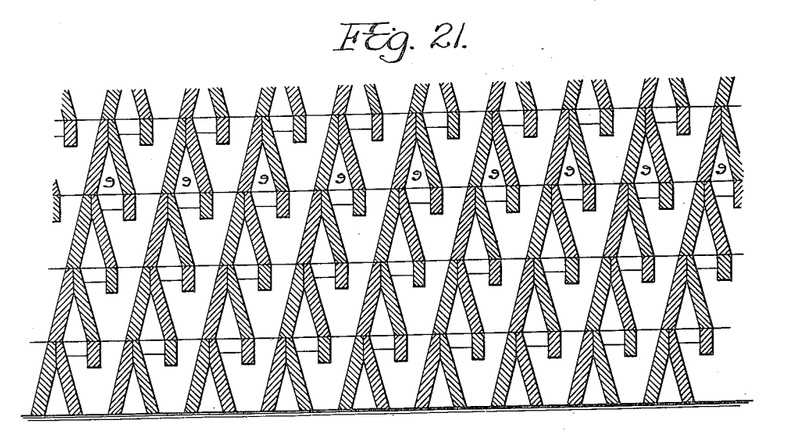

In the structure shown in Fig. 21 the blocks of the transverse rows are also disposed closely together end to end but both ends of each block are inclined inwardly from top to bottom so that the longitudinal passages 9 vary slightly in shape from those shown in Fig. 20.

It will, of course, be understood that the transverse rows of blocks in the structures shown in Figs. 20 and 21 are separated from one another by transverse passages 10 as in the other structures and that the blocks of adjoining transverse rows are staggered so as to prevent direct flow of gases from the passages 9 of one transverse row to those of a following transverse row.

Whatever form of block is used it is advisable that it should not present to a gas passage a horizontal surface of such area that dust could be deposited and remain thereon, and for this reason the blocks are preferably so constructed that the upper edges of the same presented to the passages 9 and 10 are reduced in width, as by beveling the upper portions of the corresponding walls of the blocks, as shown for instance in Figs. $4^a$, $12^a$, $18^a$, $19^a$, $19^b$, $20^a$ and $21^a$.

I claim:

1. In a device for separating dust from dust laden gases, the combination of members having passages therethrough for the falling dust particles, said members being so disposed as to form between them flow passages for the gas above and transverse to said dust passages.

2. In a device for separating dust from dust laden gases, the combination of members having passages therethrough for the falling dust particles, said members being so disposed as to form between them flow passages for the gases above and transverse to said dust passages, and to protect the falling dust particles from said gas flow.

3. In a device for separating dust from dust laden gases, the combination of members having passages therethrough for the falling dust particles, said members being so disposed in superposed courses as to form between them passages for the flow of the gases, said gas passages of one course communicating with dust passages of the members of a course below.

4. In a device for separating dust from dust laden gases, the combination of members having passages therethrough for the falling dust particles, said members being so disposed in superposed courses as to form between them passages for the flow of the gases, said gas passages of one course communicating with the dust passages of the members of a course below, and the dust passages of the members of adjoining courses communicating with one another.

5. In a device for separating dust from dust laden gases, the combination of members having passages therethrough for the falling dust particles, said members being so disposed in superposed courses as to form gas passages communicating with said dust passages, the latter, after the falling dust particles have entered them, shielding said particles from the gas during their further fall.

6. In a device for separating dust from dust laden gases, the combination of members having passages therethrough for the falling dust particles, said members being so disposed in superposed courses as to form gas passages communicating with said dust passages, the latter, after the falling dust particles have passed through the uppermost member, permitting said particles, during their further fall, to drop vertically while shielded from the gas flow.

7. In a device for separating dust from dust laden gases, the combination of members having passages therethrough for the falling dust particles, said members being so disposed in superposed courses as to form between them communicating longitudinal and transverse passages for the flow of the gases, said passages of one course communicating with the dust passages of the members of a course below.

8. In a device for separating dust from dust laden gases, the combination of members having passages therethrough for the falling dust particles, said members being disposed in superposed courses and the members of each course being in staggered relation to one another and forming deflecting gas passages communicating with the dust passages of the members of lower courses.

9. In a device for separating dust from dust laden gases, the combination of members having passages therethrough for the falling dust particles, said members being disposed in superposed courses and the members of each course being in staggered relation to one another and forming deflecting gas passages communicating with the dust passages of the members of lower courses, which dust passages are shielded from the gas flow.

10. In a device for separating dust from dust laden gases, the combination of members having passages therethrough for the falling dust particles, said members being disposed in superposed courses and the members of each course being in staggered relation to one another and to the members of adjoining courses so as to form deflecting gas passages communicating with the dust passages of members of lower courses.

11. In a device for separating dust from dust laden gases, the combination of members having passages therethrough for the falling dust particles, said members being disposed in superposed courses and the members of each course being in staggered relation to one another and to the members of adjoining courses so as to form deflecting gas passages communicating with the dust passages of members of lower courses, which dust passages are shielded from the gas flow.

12. In a device for separating dust from dust laden gases, the combination of members having passages therethrough for the falling dust particles, said members being disposed in superposed courses with gas passages between the members of a row, the members of adjoining rows being in staggered relation to one another whereby those of one row will be in line with the gas passages of those of adjacent rows.

13. In a device for separating dust from dust laden gases, the combination, in superposed courses, of members having passages therethrough for the falling dust particles, said members being disposed in longitudinally spaced transverse rows with gas passages between the members of each transverse row, the members of adjacent rows being disposed in staggered relation to one another whereby those of one transverse row will be in line with the gas passages between those of adjacent transverse rows.

14. In a device for separating dust from dust laden gases, the combination, in superposed courses, of members having passages therethrough for the falling dust particles, said members being disposed in transversely spaced longitudinal rows with gas passages between the members of each longitudinal row, the members of adjacent longitudinal rows being disposed in staggered relation to one another whereby those of one longituditial row will be in line with the gas passages between those of the adjacent longitudinal rows.

15. In a device for separating dust from dust laden gases, the combination, in superposed courses, of members having passages therethrough for the falling dust particles, said members being disposed in longitudinally spaced transverse rows and transversely spaced longitudinal rows whereby passages are formed between the members of each row, the blocks of adjacent longitudinal rows and of adjacent transverse rows being disposed in staggered relation to one another, whereby those of each transverse and each longitudinal row will be in line respectively with the gas passages between those of adjacent transverse and longitudinal rows.

16. In a device for separating dust from dust laden gases, the combination of members having passages therethrough for the falling dust particles, said members being disposed in superposed courses, with gas passages between the members of each course, side walls of members of one course resting upon side walls of members of a course beneath.

17. In a device for separating dust from dust laden gases, the combination of members having passages therethrough for the falling dust particles, said members being disposed in superposed courses, with gas passages between the members of each course, end walls of members of one course resting on end walls of members of a course beneath.

18. In a device for separating dust from dust laden gases, the combination of members having passages therethrough for the falling dust particles, said members being disposed in superposed courses, with gas passages between the members of each course, end walls of members of a transverse row of one course resting on end walls of members of one of the adjacent transverse rows of a course beneath, and corners of the members of the transverse row of the first course resting upon corners of the members of another transverse row of a course beneath.

19. In a device for separating dust from dust laden gases, the combination of members having passages therethrough for the falling dust particles, said members being disposed in superposed courses with gas passages between the members of each course, the dust passages of members of adjoining courses communicating with each other, and said passages having therein inclined partitions for directing the dust from an upper to a lower member.

20. In a device for separating dust from dust laden gases, the combination of members having passages therethrough for the falling dust particles, said members being disposed in superposed courses with gas passages between the members of each course, the dust passages of members of adjoining courses communicating with each other, and said passages having therein inclined partitions for directing the dust from an upper to a lower member, the inclined partitions of the members of one course discharging onto the inclined partitions of the members of a course below.

21. In a device for separating dust from dust laden gases, the combination of members having passages therethrough for the falling dust particles, said members being disposed in superposed courses with gas passages between the members of each course, the dust passages of members of adjoining courses communicating with each other, and said passages having therein inclined partitions for directing the dust from an upper to a lower member, and the lower ends of the inclined partitions of the members of one course joining the upper ends of the inclined partitions of the members of a course below.

22. In a device for separating dust from dust laden gases, the combination of superposed courses of members having passages therethrough for the falling dust particles, and gas passages between the members of a course, the upper edges of the walls of the members which are exposed to the gas flow being so reduced in thickness as to provide no support for the accumulation of dust.

23. In a device for separating dust from dust laden gases, the combination of members having passages therethrough for the falling dust particles, said members being so disposed in superposed courses as to form between them passages for the flow of the gases, said passages of one course communicating with the dust passages of the members of a course below, and the upper edges of the walls of the members which are exposed to the gas flow being so reduced in thickness as to provide no support for the accumulation of dust.

24. In a device for separating dust from dust laden gases, the combination of members having passages therethrough for the falling dust particles, said members being so disposed in superposed courses as to form between them passages for the flow of the gases, said passages of one course communicating with the dust passages of the members of a course below, and the members of alternate courses being of lesser horizontal dimensions than the members of the intervening courses.

25. In a device for separating dust from dust laden gases, the combination of members so disposed as to form between them flow passages for the gases, said members having passages therethrough for falling dust particles, which passages are transverse to the flow passages and are closed at the sides against the flow passages but open thereto at the top.

26. In a device for separating dust from dust laden gases, the combination of members so disposed in superposed courses as to form flow passages between them, said members having dust passages therethrough which are closed at the sides against the flow passages of the same course but are open to the flow passages of a course above.

27. The within described member for a furnace dust collector, said member having side and end walls, and an inclined transverse partition.

28. The within described member for a furnace dust collector, said member having side and end walls, and an inclined transverse partition extending from the top of the member at one end to the bottom of the member at a point midway or thereabouts between the ends.

29. The within described member for a furnace dust collector, said member having side and end walls, one of said walls being inclined inwardly from top to bottom and said member also having through the same from top to bottom a passage for dust particles.

30. The within described member for a furnace dust collector, said member having side and end walls, two of said walls being inclined inwardly from top to bottom and said member also having through the same from top to bottom a passage for dust particles.

31. The within described member for a furnace dust collector, said member having side and end walls, and one end wall and one side wall flaring outwardly toward the top so as to present dust receiving passages to both longitudinal and transverse gas passages.

In testimony whereof, I have signed my name to this specification, in the presence of two subscribing witnesses.

UTLEY WEDGE.

Witnesses:
HARRY L. SMITH,
KATE A. BEADLE.